US012451030B2

(12) United States Patent
Takahashi et al.

(10) Patent No.: US 12,451,030 B2
(45) Date of Patent: Oct. 21, 2025

(54) SECURE PAGERANK COMPUTATION SYSTEM, METHOD THEREFOR, SECURE COMPUTATION APPARATUS, AND PROGRAM

(71) Applicant: NTT, Inc., Tokyo (JP)

(72) Inventors: Satoshi Takahashi, Musashino (JP); Tetsushi Morita, Musashino (JP); Osamu Takino, Musashino (JP)

(73) Assignee: NTT, Inc., Tokyo (JP)

( * ) Notice: Subject to any disclaimer, the term of this patent is extended or adjusted under 35 U.S.C. 154(b) by 137 days.

(21) Appl. No.: 18/275,618

(22) PCT Filed: Feb. 10, 2021

(86) PCT No.: PCT/JP2021/004980
§ 371 (c)(1),
(2) Date: Aug. 3, 2023

(87) PCT Pub. No.: WO2022/172363
PCT Pub. Date: Aug. 18, 2022

(65) Prior Publication Data
US 2024/0119866 A1    Apr. 11, 2024

(51) Int. Cl.
*G06F 21/00*    (2013.01)
*G09C 1/00*    (2006.01)

(52) U.S. Cl.
CPC .................... *G09C 1/00* (2013.01)

(58) Field of Classification Search
CPC ....................................... G09C 1/00
See application file for complete search history.

(56) References Cited

U.S. PATENT DOCUMENTS
2016/0364794 A1    12/2016    Chari et al.

FOREIGN PATENT DOCUMENTS
WO    2020102395 A1    5/2020

OTHER PUBLICATIONS

Ferhat Ozgur Catak, Privacy Preserving PageRank Algorithm by Using Secure Multi-Party Computation, 2016 (Year: 2016).*

(Continued)

*Primary Examiner* — Rodman Alexander Mahmoudi
(74) *Attorney, Agent, or Firm* — XSENSUS LLP (57) ABSTRACT

To calculate PageRank with high accuracy using transaction data held by a plurality of data sources as input and keeping the transaction data of each data source secret. A data source apparatus (1) calculates a transaction rate for each combination of transaction entities (S12). The data source apparatus (1) encrypts the transaction rate and transmits the encrypted transaction rate to each secure computation apparatus (2) (S13). Each secure computation apparatus (2) receives a ciphertext of the transaction rate from a plurality of data source apparatuses (1) (S21). The secure computation apparatus (2) securely calculates a ciphertext which becomes, when decrypted, PageRank of the computational objective transaction entity by using the ciphertext of the transaction rate related to the computational objective transaction entity and the ciphertext of the PageRank of a transaction counterpart (S22).

7 Claims, 6 Drawing Sheets

(56) References Cited

OTHER PUBLICATIONS

Sangers et al., Secure multiparty PageRank algorithm for collaborative fraud detection, 2019, Netherlands Organisation for Applied Scientific Research (TNO), pp. 1-19 (Year: 2019).*

Sangers et al.; Secure Multiparty PageRank Algorithm for Collaborative Fraud Detection; Financial Cryptography and Data Security; Sep. 30, 2019; pp. 605-623; Lecture Notes in Computer Science, vol. 11598; Springer, Cham; isbn: 978-3-030-32100-0; doi: 10.1007/978-3-030-32101-7_35.

Page et al., "The PageRank citation ranking: Bringing order to the Web", Technical Report of the Stanford Digital Library Technologies Project, Jan. 29, 1998, pp. 1-19.

Ohnishi et al., "PageRank of Japanese inter-firm network", Information Processing Society Research Report IPSJ SIG Technical Report, The Special Interest Group Technical Reports of IPSJ, vol. 2010—MPS-81, No. 1, Dec. 16, 2010, 6 pages including English Translation.

* cited by examiner

SECURE PAGERANK COMPUTATION SYSTEM, METHOD THEREFOR, SECURE COMPUTATION APPARATUS, AND PROGRAM

CROSS-REFERENCE TO RELATED APPLICATION

The present application is based on PCT filing PCT/JP2021/004980, filed Feb. 10, 2021, the entire contents of which are incorporated herein by reference.

TECHNICAL FIELD

The present invention relates to a secure computation technique and, more particularly, to a technique of securely calculating PageRank for the purpose of computing reliability.

BACKGROUND ART

PageRank is a mechanism for determining an importance of a Web page by using link relationships of the Web page or the like (refer to NPL 1). By applying the mechanism, it is also possible to calculate PageRank from transaction data such as a commercial flow between enterprises and utilize the PageRank as an index of reliability of each enterprise (refer to NPL 2).

PRIOR ART LITERATURE

Non-Patent Literature

[NPL 1] L. Page, S. Brin, R. Motwani and T. Winograd, "The PageRank citation ranking: Bring order to the Web," Technical Report of the Stanford Digital Library Technologies Project (1998).
[NPL 2] Takaaki Ohnishi, Hideki Takayasu, and Misako Takayasu, "PageRank of Japanese inter-firm network", The Special Interest Group Technical Reports of Information Processing Society of Japan, Vol. 2010-MPS-81, No. 1, 2010

SUMMARY OF THE INVENTION

Problems to be Solved by the Invention

However, since a plurality of data distribution platform operators store transaction data between enterprises on their own in recent years, calculating PageRank from a single data source may possibly create a bias in information. On the other hand, since such transaction data includes confidential information of each enterprise, there is a problem that security issues such as data leakage occur when a plurality of data sources are simply integrated.

In view of such a technical problem, an objective of the present invention is to use transaction data held by a plurality of data sources as input and calculate PageRank with high accuracy while keeping the transaction data of each data source secret.

Means to Solve the Problems

A secure PageRank computation system according to an aspect of the present invention is a secure PageRank computation system including a plurality of secure computation apparatuses, each secure computation apparatus comprises: a PageRank storage which stores a ciphertext of PageRank of a plurality of transaction entities; a transaction rate receiving unit which receives a ciphertext of a transaction rate from each of a plurality of data sources; and a PageRank calculating unit which securely calculates, using a ciphertext of a transaction rate related to a computational objective transaction entity and a ciphertext of PageRank of a transaction counterpart that is a transaction entity having performed a transaction with the computational objective transaction entity, a ciphertext to become PageRank of the computational objective transaction entity when the ciphertext is decrypted, wherein the transaction rate represents, for each combination of transaction entities, a ratio of a transaction performed by the combination of transaction entities to an entire transaction history held by the data sources.

Effects of the Invention

According to the present invention, using transaction data held by a plurality of data sources as input, PageRank can be calculated with high accuracy while keeping the transaction data of each data source secret.

DETAILED DESCRIPTION OF THE EMBODIMENTS

Hereinafter, embodiments of the present invention will be described in detail. Note that the same reference numerals are given to constituent units that have same functions in the drawings and repetitive descriptions thereof will be omitted.

EMBODIMENT

An embodiment of the present invention is a secure PageRank computation system and method which use a ciphertext of transaction data input from a plurality of data sources to generate PageRank while keeping the transaction data secret.

On measuring reliability of enterprises using PageRank, if PageRank is to be calculated solely based on one data source, there is a possibility that even an unreliable enterprise in fact may be determined to have high reliability. In consideration thereof, calculating PageRank using a plurality of data sources is expected to increase accuracy of reliability of the PageRank. However, generating PageRank using a plurality of data sources requires innovative technical approaches for preventing information held in each data source from being leaked to other data sources. In particular, for entities aimed at collecting and utilizing data such as a data distribution platform, accumulated data itself is the value of the entities, and it is difficult for such entities to readily provide other entities with such data.

Therefore, the secure PageRank computation system according to the embodiment solves the problem described above by securely calculating a PageRank formula with a plurality of data sources as inputs to obtain PageRank while keeping the input data from each data source secret.

Figure 1:
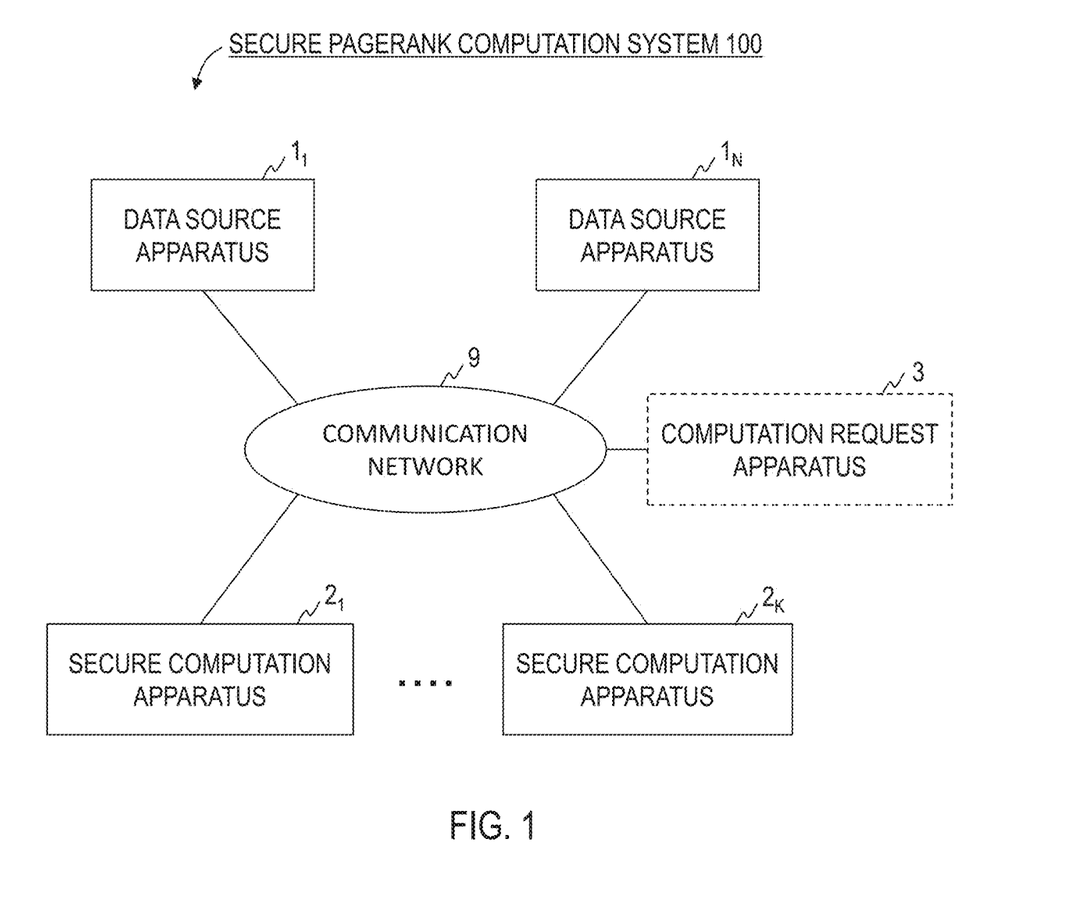
FIG. 1 is a diagram illustrating a functional configuration of a secure PageRank computation system.

As shown in FIG. 1, a secure PageRank computation system 100 according to the embodiment includes N ($\geq 2$) data source apparatuses $1_1, \ldots, 1_N$ and K ($\geq 1$) secure computation apparatuses $2_1, \ldots, 2_K$. The data source apparatuses $1_1, \ldots, 1_N$, and the secure computation apparatuses $2_1, \ldots, 2_K$ are, respectively, connected to a communication network 9. The communication network 9 is a communication network adopting a circuit switching scheme or a packet switching scheme configured such that connected apparatuses can communicate with each other and, for example, the Internet, a LAN (Local Area Network), or a WAN (Wide Area Network) can be used.

Any one of the data source apparatuses $1_1, \ldots, 1_N$ plays a role of requesting computation of PageRank (hereinafter, also referred to as a "computation request apparatus"). In addition, any one of the data source apparatuses $1_1, \ldots, 1_N$ which is not the computation request apparatus plays a role of registering an initial value of PageRank (hereinafter, also referred to as an "initialization apparatus").

When there are a plurality of secure computation apparatuses 2 (in other words, when $K \geq 2$), a secure computation apparatus $2_k$ ($k \in \{1, \ldots, K\}$) uses a secure computation method based on secret sharing such as Shamir's secret sharing or replicated secret sharing to calculate PageRank while cooperating with other secure computation apparatuses $2_{k'}$ ($k' \in \{1, \ldots, K\}$ and $k \neq k'$). When there is one secure computation apparatus 2 (in other words, when $K=1$), the secure computation apparatus 2 calculates PageRank using a secure computation method based on an encryption method such as homomorphic encryption.

Figure 2:
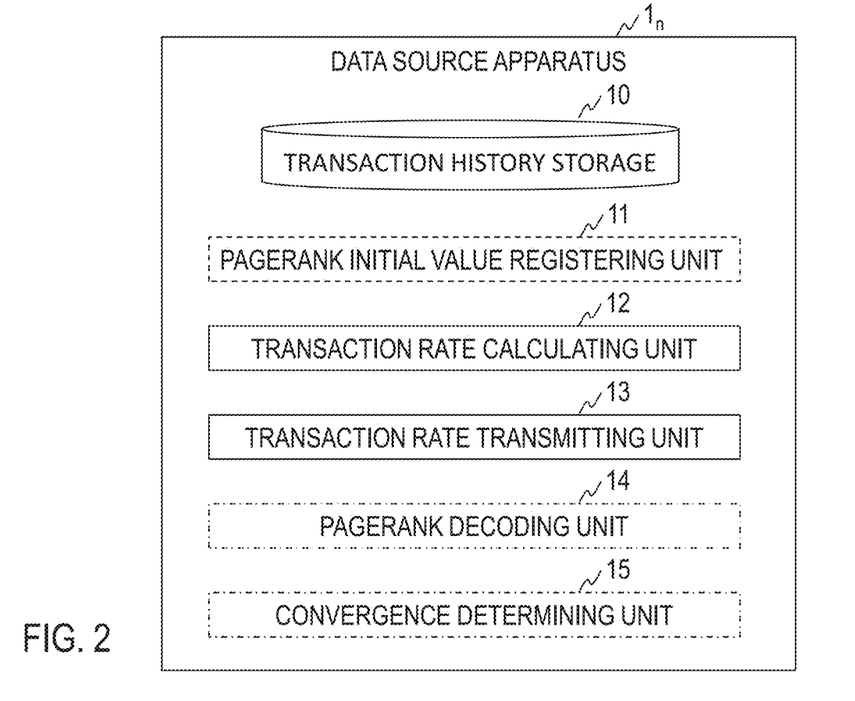
FIG. 2 is a diagram illustrating a functional configuration of a data source apparatus.
Figure 3:
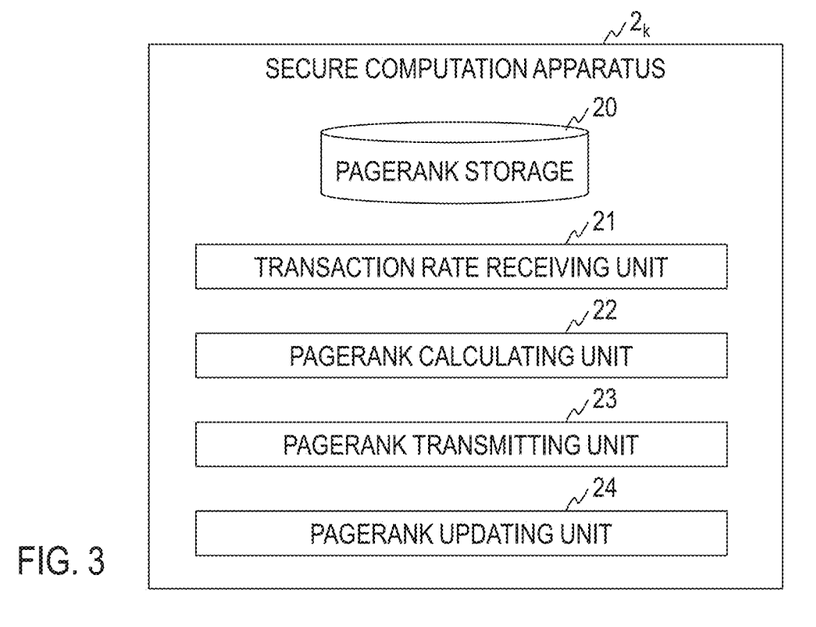
FIG. 3 is a diagram illustrating a functional configuration of a secure computation apparatus.

For example, as shown in FIG. 2, the data source apparatus $1_n$ ($n=1, \ldots, N$) includes a transaction history storage 10, a transaction rate calculating unit 12, and a transaction rate transmitting unit 13. A data source apparatus which is also a computation request apparatus further includes a PageRank decoding unit 14 and a convergence determining unit 15 represented by dashed-dotted lines in FIG. 2. A data source apparatus which is also an initialization apparatus further includes a PageRank initial value registering unit 11 represented by a dashed line in FIG. 2. A secure computation apparatus $2_k$ ($k=1, \ldots, K$) includes, as shown in FIG. 3 for example, a PageRank storage 20, a transaction rate receiving unit 21, a PageRank calculating unit 22, a PageRank transmitting unit 23, and a PageRank updating unit 24. The secure PageRank computation method according to the embodiment is realized as the data source apparatuses $1_1, \ldots, 1_N$ and the secure computation apparatuses $2_1, \ldots, 2_K$ perform processing of each step shown in FIG. 4 together.

The data source apparatus $1_n$ and the secure computation apparatus $2_k$ are, for example, special apparatuses constructed by loading a special program to a known or dedicated computer having a central processing unit (CPU), a main storage apparatus (RAM: Random Access Memory), and the like. For example, the data source apparatus $1_n$ and the secure computation apparatus $2_k$ execute each step of processing under the control of the central processing unit. Data input to the data source apparatus $1_n$ and the secure computation apparatus $2_k$ and data obtained by the various steps of processing are, for example, stored on the main storage apparatus, and the data stored on the main storage apparatus is loaded to the central processing unit as needed to be utilized in other steps of processing. At least a part of each processing unit of the data source apparatus $1_n$ and the secure computation apparatus $2_k$ may be constituted by hardware such as an integrated circuit. Each storage included in the data source apparatus $1_n$ and the secure computation apparatus $2_k$ may be constituted by, for example, a main storage apparatus such as a RAM (Random Access Memory), an auxiliary storage apparatus constituted by a hard disk, an optical disk, or a semiconductor memory element such as a flash memory, or middleware such as a relational database or a key-value store.

Figure 4:
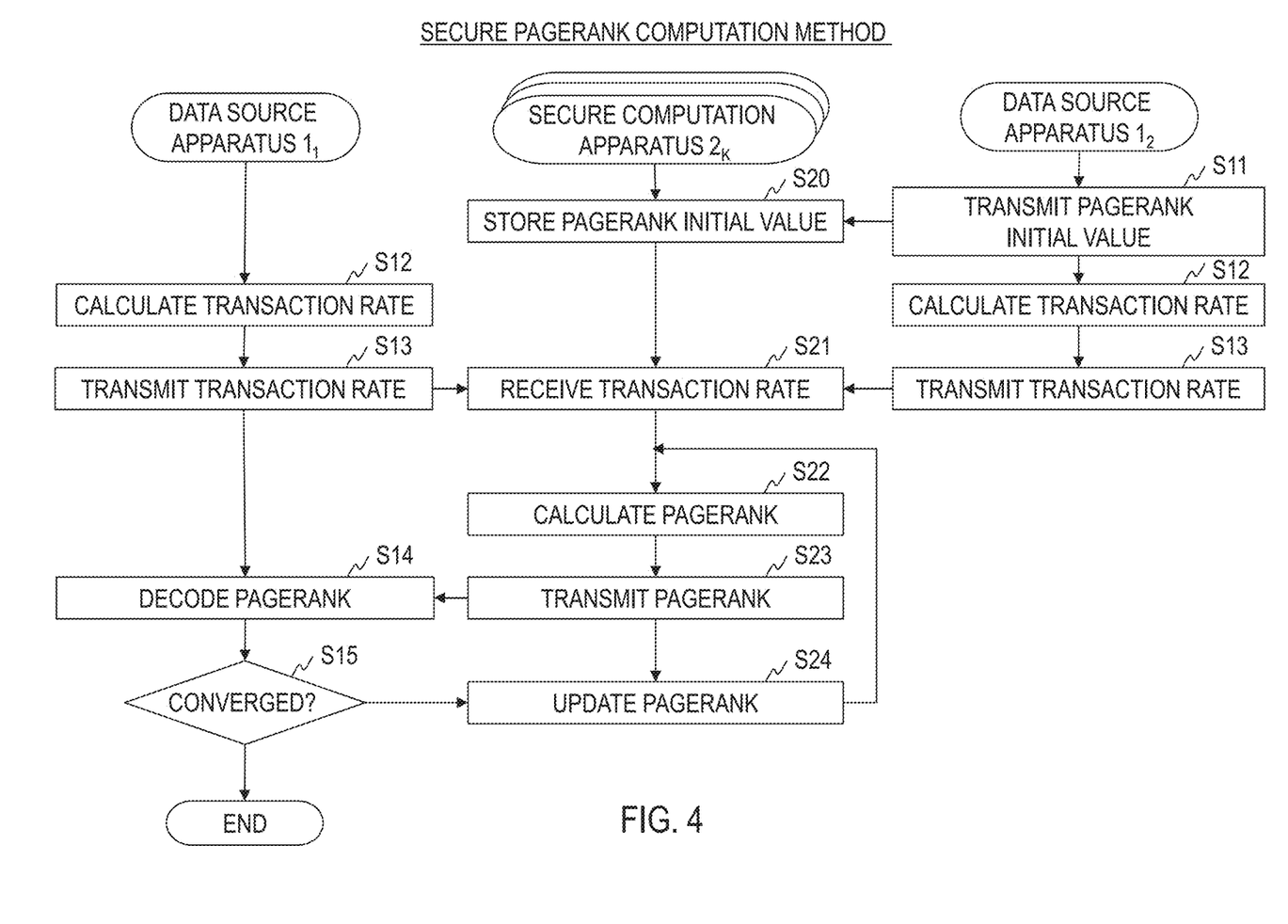
FIG. 4 is a diagram illustrating a processing procedure of a secure PageRank computation method.

A processing procedure of the secure PageRank computation method that is executed by the secure PageRank computation system 100 according to the embodiment will be described with reference to FIG. 4. In the example shown in FIG. 4, it is assumed that the secure PageRank computation system 100 includes two data source apparatuses $1_1$ and $1_2$, the data source apparatus $1_1$ is a computation request apparatus, and the data source apparatus $1_2$ is an initialization apparatus.

The transaction history storage 10 of each data source apparatus $1_n$ stores a transaction history representing the contents of a transaction performed between two transaction entities handled by the data source apparatus $1_n$.

In step S11, the PageRank initial value registering unit 11 of the data source apparatus $1_2$ randomly generates an initial value of PageRank $PR_i$ of each transaction entity i ($i=1, \ldots, I$, where I denotes a total number of transaction entities) included in the transaction history stored in the transaction history storage 10. Next, the PageRank initial value registering unit 11 encrypts the initial value of the PageRank $PR_i$ of each transaction entity i and transmits a ciphertext $[PR_i]$ thereof to each of the secure computation apparatuses $2_1, \ldots, 2_K$. Note that $[\cdot]$ represents a ciphertext of a value $\cdot$, and when encryption is performed by secret sharing, $[\cdot]$ represents a shared value of the value $\cdot$. When encryption is performed by secret sharing, the shared value $[PR_i]$ of the initial value of the PageRank $PR_i$ of each transaction entity i is distributed to each of the secure computation apparatuses $2_1, \ldots, 2_K$ so that one secure computation apparatus $2_k$ holds one share $[PR_i]_k$.

In step S20, each secure computation apparatus $2_k$ stores the ciphertext $[PR_i]$ of the initial value of the PageRank $PR_i$ of each transaction entity i received from the data source apparatus $1_2$ in the PageRank storage 20.

In step S12, the transaction rate calculating unit 12 of each data source apparatus $1_n$ calculates, from the transaction history stored in the transaction history storage 10, a transaction rate $k''_{j \to i}$ for each combination (i, j) of transaction entities (j $\in V_i$, where $V_i$ denotes a set of transaction counterparts which are transaction entities who have performed a transaction with the transaction entity i). Note that $k''_{j \to i}$ represents a transaction rate related to the transaction entity i and a transaction counterpart j held by an n-th data source apparatus $1_n$. The transaction rate represents a ration of a transaction performed in a combination of certain transaction entities among the entire transaction history. For example, when a data source is a bank and a transaction is a transfer, a value obtained by dividing a total sum of transfer amounts handled by the bank from a certain enterprise to other enterprises by the total sum of transfer amounts recorded in the transaction history is a transaction rate from the certain enterprise to the other enterprises. The transaction rate is calculated for all combinations of transaction entities recorded in the transaction history. The transaction rate calculating unit 12 outputs the calculated transaction rate $k''_{j \to i}$ to the transaction rate transmitting unit 13.

In step S13, the transaction rate transmitting unit 13 of each data source apparatus $1_n$ encrypts a product $\alpha_n k''_{j \to i}$ of the input transaction rate $k''_{j \to i}$ and a predetermined weight $\alpha_n$ and transmits a ciphertext $[\alpha_n k''_{j \to i}]$ thereof to each of the secure computation apparatuses $2_1, 2_K$. When encryption is performed by secret sharing, a shared value $[\alpha_n k''_{j \to i}]$ of the transaction rate is distributed to each of the secure computation apparatuses $2_1, 2_K$ so that one secure computation apparatus $2_k$ holds one share $[\alpha_n k''_{j \to i}]$. The weights $\alpha_1, \ldots, \alpha_N$ held by each of the data source apparatuses $1_1, \ldots, 1_N$ are assumed to be set in advance in each of the data source apparatuses $1_1, \ldots, 1_N$ so as to satisfy $\alpha_1 + \ldots + \alpha_N = 1$.

In step S21, the transaction rate receiving unit 21 of each secure computation apparatus $2_k$ receives ciphertexts $[\alpha_1 k^1_{j \to i}], \ldots, [\alpha_N k^N_{j \to i}]$ of the transaction rate from each of the data source apparatuses $1_1, \ldots, 1_N$.

In step S22, the PageRank calculating unit 22 of each secure computation apparatus $2_k$ securely calculates a ciphertext $[PR_i]$ that becomes, when decrypted, the PageRank $PR_i$ of the transaction entity i, which is an objective of computation, using the ciphertexts $[\alpha_1 k^1_{j \to i}], \ldots, [\alpha_N k^N_{j \to i}]$ of the transaction rate related to the transaction entity i ($\in \{1, \ldots, I\}$) and a ciphertext $[PR_j]$ of PageRank $PR_j$ of a transaction counterpart j ($j \in V_i$) who has performed a transaction with the transaction entity i. Note that the number of computational objective transaction entities need not be one and PageRank may be calculated for all transaction entities or PageRank may be calculated for a plurality of arbitrarily-selected transaction entities. The PageRank calculating unit 2 outputs the ciphertext $[PR_i]$ of the PageRank $PR_i$ of the transaction entity i to the PageRank transmitting unit 23.

Specifically, the PageRank calculating unit 22 calculates the following formula to obtain the ciphertext $[PR_i]$ of the PageRank $PR_i$ of the transaction entity i.

$$[PR_i] = \Sigma_{j \in V_i}[PR_j] \times ([\alpha_1 k_{j \to i}^1] + [\alpha_2 k_{j \to i}^2] + \ldots + [\alpha_N k_{j \to i}^N])$$ [Math. 1]

In step S23, the PageRank transmitting unit 23 of each secure computation apparatus $2_k$ transmits the input ciphertext $[PR_i]$ of the PageRank $PR_i$ of the transaction entity i to a data source apparatus $1_1$ serving as a computation request apparatus.

In step S14, the PageRank decoding unit 14 of the data source apparatus $1_1$ decodes the ciphertext $[PR_i]$ of the PageRank $PR_i$ of the transaction entity i received from each of the secure computation apparatuses $2_1, \ldots, 2_K$ and obtains the PageRank $PR_i$ of the transaction entity i.

In step S15, the convergence determining unit 15 of the data source apparatus $1_1$ determines whether or not the PageRank $PR_i$ of the transaction entity i has converged. The determination as to whether or not convergence has occurred may be made by comparing a difference between the PageRank before the computation and the PageRank after the computation with a predetermined threshold. When the convergence determining unit 15 determines that the PageRanks of all the computational objective transaction entities have converged, the processing is completed. When it is determined that the PageRank of any of the computational objective transaction entity has not converged, the calculated PageRank $PR_i$ is encrypted and a ciphertext $[PR_i]$ thereof is transmitted to each of the secure computation apparatuses $2_1, \ldots, 2_K$.

In step S24, when the PageRank updating unit 25 of each secure computation apparatus $2_k$ receives the ciphertext $[PR_i]$ of the calculated PageRank $PR_i$ from the data source apparatus $1_1$ serving as a computation request apparatus, the PageRank updating unit 25 updates the ciphertext $[PR_i]$ of the PageRank $PR_i$ stored in the PageRank storage 10 with the ciphertext of the PageRank. Subsequently, the processing returns to step S22. Accordingly, the computation of PageRank and the convergence determination are executed once again.

First Modification

The secure PageRank computation system 100 according to the embodiment is configured such that any one of the plurality of data source apparatuses $1_n$ plays a role of a computation request apparatus. However, a computation request apparatus may be configured as a single apparatus other than the data source apparatuses $1_n$. In this case, the secure PageRank computation system 100 further includes the computation request apparatus 3 represented by a dashed line in FIG. 1. The computation request apparatus 3 includes the PageRank decoding unit 14 and the convergence determining unit 15 formerly included in the data source apparatus $1_1$ served as a computation request apparatus in the secure PageRank computation system 100 according to the embodiment. The secure PageRank computation system according to the first modification solely differs from the secure PageRank computation system according to the embodiment in that a destination to which the PageRank transmitting unit 23 of each of the secure computation apparatuses $2_1, \ldots, 2_K$ transmits the ciphertext of the calculated PageRank is the computation request apparatus 3 instead of the data source apparatus $1_1$ served as a computation request apparatus.

Second Modification

The secure PageRank computation system 100 according to the embodiment is configured such that a weight $\alpha_n$ is set to the data source apparatus $1_n$ in advance and the transaction rate transmitting unit 13 calculates a product of a transaction rate $k''_{j \to i}$ and the weight $\alpha_n$. However, weights $\alpha_1, \ldots, \alpha_N$ may be set to the secure computation apparatuses $2_1, \ldots, 2_K$ in advance instead of the data source apparatus $1_n$. In this case, the transaction rate transmitting unit 13 of the data source apparatus $1_n$ transmits a ciphertext $[k''_{j \to i}]$ of the transaction rate $k''_{j \to i}$ to each of the secure computation apparatuses $2_1, \ldots, 2_K$. The PageRank calculating unit 22 of each of the secure computation apparatuses $2_1, \ldots, 2_K$ securely calculates a PageRank formula after multiplying the ciphertext $[k''_{j \to i}]$ of the transaction rate $k''_{j \to i}$ received from the data source apparatus $1_n$ by the weight $\alpha_n$ by a secure computation.

Third Modification

The secure PageRank computation system 100 according to the embodiment is configured such that, when the convergence determining unit 15 of the data source apparatus $1_1$ serving as a computation request apparatus determines that PageRank of any of the computational objective transaction entity has not converged, a ciphertext $[PR_i]$ of a calculated PageRank $PR_i$ is transmitted to each of the secure computation apparatuses $2_1, \ldots, 2_K$, and the PageRank updating unit 25 of each of the secure computation apparatuses $2_k$ updates the ciphertext $[PR_i]$ of the PageRank $PR_i$ stored in the PageRank storage 10 with the ciphertext $[PR_i]$ of the received PageRank $PR_i$. However, a configuration may be adopted in which, when the convergence determining unit 15 of the data source apparatus $1_1$ determines that PageRank of any of the computational objective transaction entity has not converged, only a signal instructing a continuation of computation is transmitted to each of the secure computation apparatuses $2_1, \ldots, 2_K$, and the PageRank updating unit 25 of each secure computation apparatus $2_k$ updates, when receiving the signal instructing the continuation of computation, the ciphertext $[PR_i]$ of the PageRank $PR_i$ stored in the PageRank storage 10 with the ciphertext $[PR_i]$ of the PageRank $PR_i$ calculated by the PageRank calculating unit 22.

First Example

Figure 5:
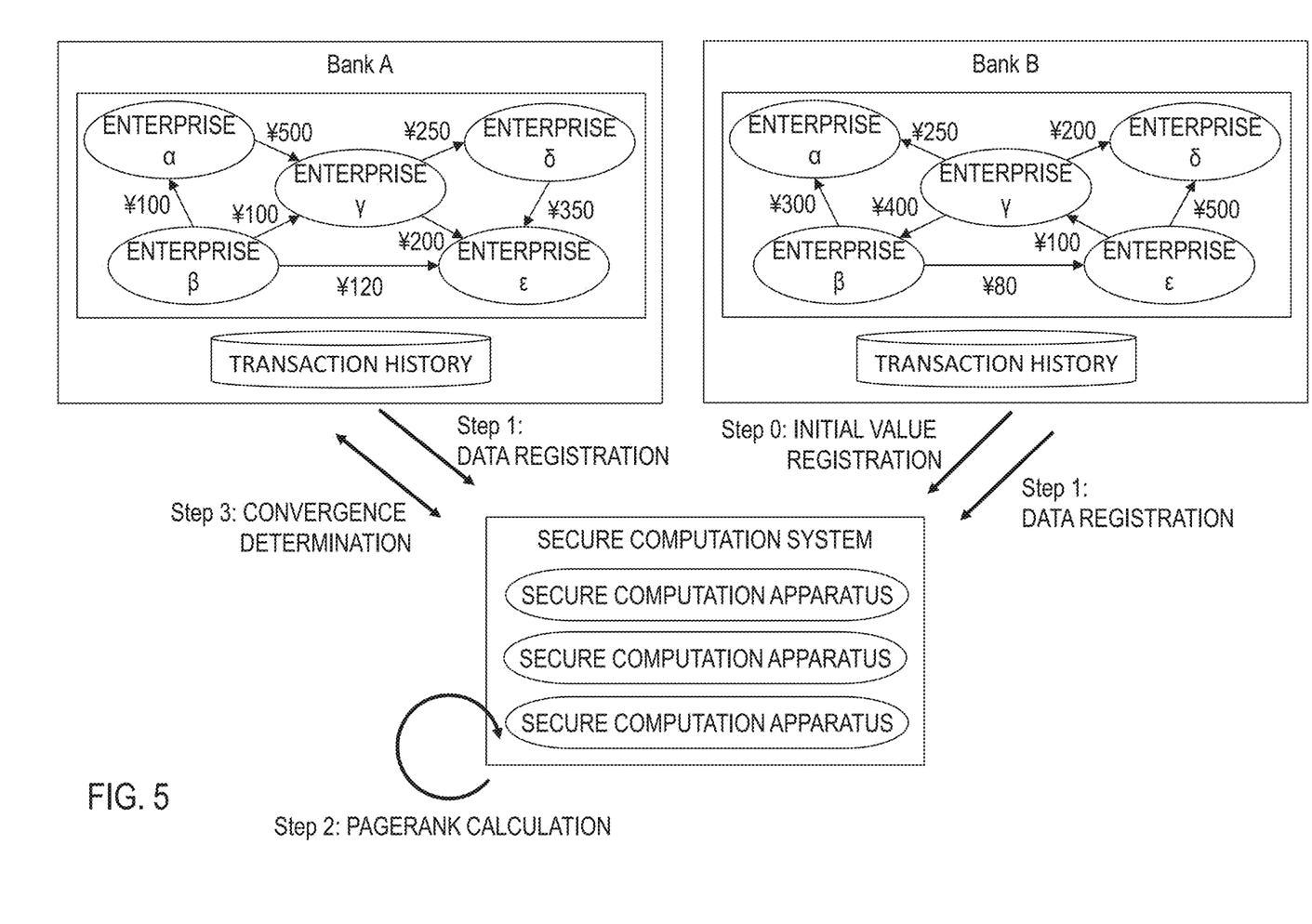
FIG. 5 is a diagram for describing a first example.

The first example is an example in which the secure PageRank computation system according to the embodiment is applied to credit determination at a bank. As shown in FIG. 5, the secure PageRank computation system according to the first example is made up of a bank A, a bank B, and a secure computation system. The secure computation system includes a plurality of secure computation apparatuses. The bank A and the bank B respectively hold transaction histories between their own client enterprises. In the example shown in FIG. 5, enterprises α, β, γ, δ, and ε are client enterprises of each bank. In FIG. 5, an arrow connecting the enterprises represents a bank transfer (transaction). An amount of money described in the vicinity of an arrow is an amount of money transferred. For example, in the transaction history of the bank A, a transaction in which 100 yen has been transferred from the enterprise α to the enterprise γ is recorded. In other words, the banks A and B correspond to data source apparatuses.

The bank A requests the secure computation system to calculate PageRank of a client enterprise for credit determination. In other words, the bank A corresponds to a computation requesting apparatus. Priory, the bank B registers an initial value of the PageRank of each enterprise to the secure computation system (step 0). In other other words, the bank B corresponds to an initializing apparatus. The bank B randomly generates the initial value of the PageRank, encrypts the random value by secret sharing, and registers a shared value to the secure computation system. The reason why the bank B which does not make a computation request registers the initial value of the PageRank is to prevent transaction-related information held by the bank B from leaking to the bank A which makes a computation request.

The bank A and the bank B aggregate the amount of money transferred for each combination of enterprises from the transaction history held by themselves, and obtain a rate occupied in the entire transaction history (hereinafter referred to as a "transfer amount ratio"). The bank A and the bank B encrypt the obtained transfer amount ratio by secret sharing, and register a shared value to the secure computation system (step 1). The bank B may execute step 0 and step 1 at the same time, namely, the bank B may register the shared value of the transfer amount ratio and the shared value of the initial value of the PageRank to the secure computation system at the same time.

In response to a computation request from the bank A, the secure computation system securely calculates PageRank for each enterprise by using the registered shared value of the transfer amount ratio and the registered shared value of the PageRank (step 2). The secure computation system transmits the calculated shared value of the PageRank of each enterprise to the bank A having made the computation request.

The bank A restores the shared value of the PageRank of each enterprise received from the secure computation system and obtains plaintext PageRank. In addition, the bank A determines whether or not the obtained PageRanks have converged. When the bank A determines that the PageRank of each enterprise has not converged, the bank A transmits the shared value of the PageRank to the secure computation system. The secure computation system updates the stored shared value of the PageRank of each enterprise with the received shared value of the PageRank of each enterprise (step 3), and calculates the PageRank once again (step 2). When it is determined that the PageRank of each enterprise has converged, the bank A uses the converged PageRank to determine the credit of the enterprise.

Second Example

Figure 6:
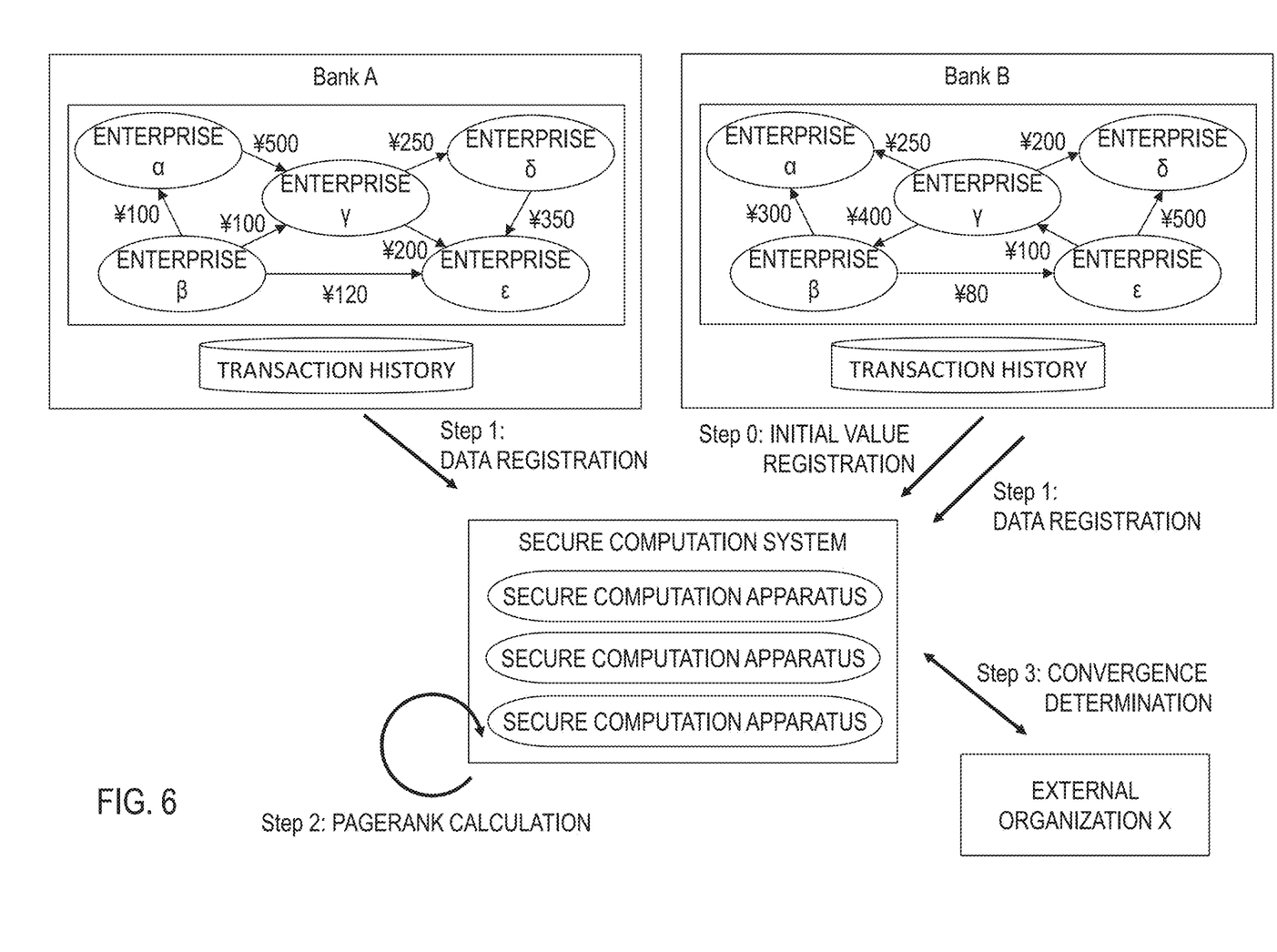
FIG. 6 is a diagram for describing a second example.

The second example is an example which applies the secure PageRank computation system according to the first modification to provide a credit result for an external organization. The external organization requests computation of PageRank in order to perform credit determination when performing a new transaction with an enterprise included in the transaction history of each bank. As shown in FIG. 6, the secure PageRank computation system according to the second example includes an external organization X in addition to the bank A, the bank B and the secure computation system. The secure computation system transmits a calculated shared value of PageRank to the external organization X and the external organization X determines convergence of the PageRank (step 3). When the external organization X determines that PageRank has converged, the external organization X uses the converged PageRank to perform credit determination of the enterprise. Other steps of processing are similar to those performed in the first example.

While embodiments of the present invention have been described above, it is needless to say that specific configurations are not limited to the embodiments and that appropriate modifications of design and the like made without departing from the spirit of the invention are also included in the invention. Various steps of processing described in the embodiments are not limited to being executed in time series in the order described and may be executed in parallel or individually either in accordance with the processing capability of an apparatus that executes the processing or as necessary.

Program and Recording Medium

Figure 7:
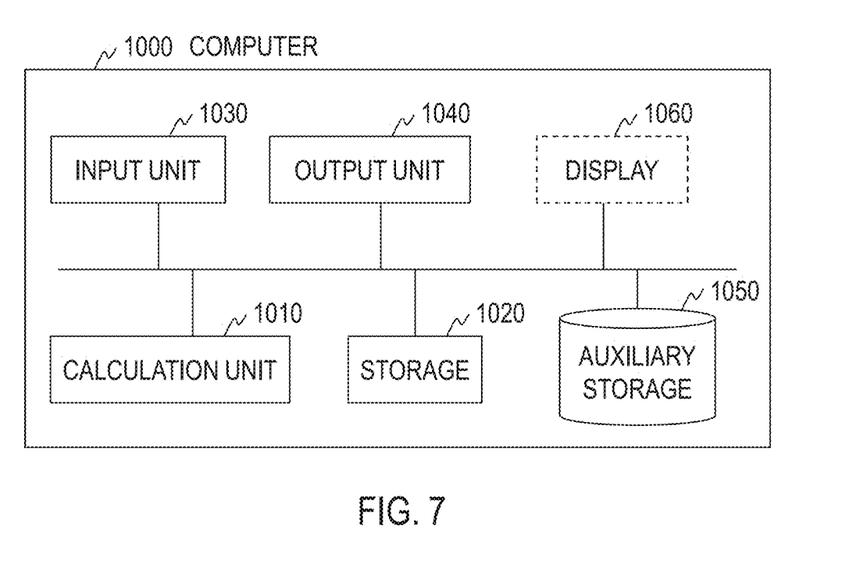
FIG. 7 is a diagram illustrating a functional configuration of a computer.

When various processing functions of each apparatus described in the above embodiment are to be realized by a computer, processing contents of the functions to be provided in each apparatus are described by a program. In addition, the various processing functions of each apparatus described above are realized on a computer shown in FIG. 7 by loading the program to a storage 1020 of the computer and causing a calculation unit 1010, an input unit 1030, an output unit 1040, and the like to run according to the program.

The program describing the processing contents can be recorded on a computer-readable recording medium. Examples of the computer-readable recording medium include non-transitory recording media such as a magnetic recording apparatus or an optical disk.

In addition, the program is distributed by, for example, sales, transfer, or rent of a portable recording medium such as a DVD or a CD-ROM on which the program is recorded. Furthermore, the program may be distributed by storing the program in advance in a storage apparatus of a server computer and transferring the program from the server computer to another computer via a network.

A computer executing such a program first temporarily stores, for example, the program recorded on a portable recording medium or the program transferred from a server computer in its own auxiliary storage 1050 which is a non-temporary storage apparatus. When executing processing, the computer loads the program stored in its own auxiliary recording unit 1050 which is a non-temporary storage apparatus into a memory 1020 which is a temporary storage apparatus, and executes processing in accordance with the loaded program. As another mode of execution of the program, the computer may directly load the program from the portable recording medium and execute processing in accordance with the program and, furthermore, every time the program is transferred from the server computer to the computer, the computer may sequentially execute processing in accordance with the received program. Alternatively, a configuration may be adopted in which the processing described above is executed by a so-called ASP (Application Service Provider)-type service in which the program is not transferred from a server computer to the computer and processing functions are solely realized by an execution instruction and acquisition of a result of the program. It is assumed that the program described herein includes information which is supplied for processing by an electronic computer and which is equivalent to a program (data or the like which is not a direct command to the computer but has a property of specifying processing to be carried out by the computer).

In addition, while the apparatus is configured by executing a predetermined program on a computer in the above description, at least a part of the processing contents may be implemented by hardware.

What is claimed is:

1. A secure PageRank computation system comprising a plurality of secure computation apparatuses,
    each secure computation apparatus comprises:
    a PageRank storage which stores ciphertexts of PageRanks of a plurality of transaction entities;
    a transaction rate receiving circuitry which receives a ciphertext of a transaction rate from each of a plurality of data sources; and
    a PageRank calculating circuitry which securely calculates, using a ciphertext of a transaction rate related to a computational objective transaction entity and a ciphertext of PageRank of a transaction counterpart that is a transaction entity having performed a transaction with the computational objective transaction entity, a ciphertext to become PageRank of the computational objective transaction entity when the ciphertext is decrypted,
    wherein the transaction rate represents, for each combination of the transaction entities, a ratio of a transaction performed by the combination of transaction entities to an entire transaction history held by the data sources.

2. The secure PageRank computation system according to claim 1,
    wherein a ([·]) represents a ciphertext of a value ·, i denotes a number representing the computational objective transaction entity, j denotes a number representing the transaction counterpart, $V_i$ denotes a set of the transaction counterparts, $PR_j$ represents PageRank of the transaction counterpart j, N denotes a number of the data sources, $\alpha_1, \alpha_2, \ldots, \alpha_N$ denote weights satisfying $\alpha_1+\alpha_2+\ldots+\alpha_N=1$, $k^n_{j\to i}$, (n=1, 2, ..., N)

represents a transaction rate related to the transaction entity i and the transaction counterpart j received from an n-th data source, and the PageRank calculating circuitry calculates a ciphertext of the PageRank of the transaction entity i according to the following formula:

$$\Sigma_{j\in V_i}[PR_j]\times([\alpha_1 k_{j\to i}^1]+[\alpha_2 k_{j\to i}^2]+ \ldots +[\alpha_N k_{j\to i}^N]). \quad \text{[Math 2]}$$

3. The secure PageRank computation system according to claim 1,
    wherein the secure PageRank computation system comprises a computation request apparatus that is any of the plurality of data sources or an apparatus other than data sources,
    the computation request apparatus comprises:
    a PageRank decoding circuitry which decodes a ciphertext of PageRank of the computational objective transaction entity received from each secure computation apparatus, and
    a convergence determining circuitry which determines whether or not the PageRank of the computational objective transaction entity has converged, and
    each secure computation apparatus further comprises:
    a PageRank transmitting circuitry which transmits a ciphertext of PageRank of the computational objective transaction entity to the computation request apparatus, and
    a PageRank updating circuitry which updates the ciphertext of PageRank of the computational objective transaction entity stored in the PageRank storage when the PageRank of the computational objective transaction entity has not converged.

4. The secure PageRank computation system according to claim 3,
    wherein the secure PageRank computation system comprises an initialization apparatus that is one of the data sources other than the computation request apparatus, and
    the initialization apparatus comprises a PageRank initial value registering circuitry which encrypts a randomly-generated initial value of PageRank of the transaction counterpart and which transmits a ciphertext thereof to each secure computation apparatus.

5. A secure PageRank computation method executed by a secure PageRank computation system including a plurality of secure computation apparatuses, the method comprising:
    storing, by a PageRank storage of each secure computation apparatus, ciphertexts of PageRanks of a plurality of transaction entities,
    receiving, by a transaction rate receiving circuitry of each secure computation apparatus, a ciphertext of a transaction rate from each of the plurality of data sources, and
    performing, by a PageRank calculating circuitry of each secure computation apparatus, secure computation of a ciphertext which becomes, when decrypted, PageRank of a computational objective transaction entity using the ciphertext of the transaction rate related to the computational objective transaction entity and a ciphertext of PageRank of a transaction counterpart that is a transaction entity having performed a transaction with the computational objective transaction entity,
    wherein the transaction rate represents, for each combination of the transaction entities, a ratio of a transaction performed by the combination of transaction entities to an entire transaction history held by the data sources.

6. A non-transitory computer-readable recording medium which stores a program for causing a computer to execute each step of the secure PageRank computation method according to claim 5.

7. A secure computation apparatus used in a secure PageRank computation system comprising:
- a PageRank storage which stores ciphertexts of PageRanks of a plurality of transaction entities;
- a transaction rate receiving circuitry which receives a ciphertext of a transaction rate from each of a plurality of data sources; and
- a PageRank calculating circuitry which securely calculates, using the ciphertext of a transaction rate related to a computational objective transaction entity and a ciphertext of PageRank of a transaction counterpart that is a transaction entity having performed a transaction with the computational objective transaction entity, a ciphertext to become PageRank of the computational objective transaction entity when the ciphertext is decrypted,
- wherein the transaction rate represents, for each combination of the transaction entities, a ratio of a transaction performed by the combination of transaction entities to an entire transaction history held by the data sources.

* * * * *